(12) United States Patent
Shah Khadri et al.

(10) Patent No.: US 12,466,582 B2
(45) Date of Patent: Nov. 11, 2025

(54) COMBINED LAUNCH VEHICLE AND SATELLITE SYSTEM

(71) Applicant: AGNIKUL COSMOS PRIVATE LIMITED, Tamil Nadu (IN)

(72) Inventors: Syed Peer Mohamed Shah Khadri, Tamil Nadu (IN); Srinath Ravichandran, Tamil Nadu (IN)

(73) Assignee: AGNIKUL COSMOS PRIVATE LIMITED, Chennai (IN)

( * ) Notice: Subject to any disclaimer, the term of this patent is extended or adjusted under 35 U.S.C. 154(b) by 0 days.

(21) Appl. No.: 18/267,657

(22) PCT Filed: Dec. 15, 2021

(86) PCT No.: PCT/IN2021/051175
§ 371 (c)(1),
(2) Date: Jun. 15, 2023

(87) PCT Pub. No.: WO2022/130407
PCT Pub. Date: Jun. 23, 2022

(65) Prior Publication Data
US 2024/0051685 A1     Feb. 15, 2024

(30) Foreign Application Priority Data
Dec. 15, 2020 (IN) .............................. 202041054598

(51) Int. Cl.
*B64G 1/40* (2006.01)
*B64G 1/00* (2006.01)
*B64G 1/64* (2006.01)

(52) U.S. Cl.
CPC .......... *B64G 1/4021* (2023.08); *B64G 1/002* (2013.01); *B64G 1/4024* (2023.08); *B64G 1/6459* (2023.08)

(58) Field of Classification Search
CPC .......... B64G 1/002; B64G 1/402; B64G 1/645
See application file for complete search history.

(56) References Cited

U.S. PATENT DOCUMENTS

| 4,231,537 A | 11/1980 | Lyons |
| 4,451,017 A | 5/1984 | Marshall et al. |
| (Continued) | | |

FOREIGN PATENT DOCUMENTS

| CN | 108052030 A | 5/2018 |
| WO | 2019/098473 A1 | 5/2019 |

OTHER PUBLICATIONS

International Search Report for PCT/IN2021/051175 dated Mar. 21, 2022.

*Primary Examiner* — William L Gmoser

(57) ABSTRACT

A combined launch vehicle and satellite system relates to the satellite combined with the launch vehicle's upper stage to provide a more efficient system that includes tank separation technology which allows the satellite system to shed tanks that have used up all the propellants stored therein. The method separation of the tank set is enabled by using a merman band or pneumatic type of separation system; wherein the three bottom tanks are emptied first during the process, followed by the separation of the emptied tanks herein the fuel is completely filled in the second set of tanks. The first pair of tanks is then separated after the fuel is emptied. Similarly, the plumbing lines are also separated. The separation of the used components is achieved herein and the satellite is ready for orbit insertion.

10 Claims, 4 Drawing Sheets

(56) References Cited

U.S. PATENT DOCUMENTS

| | | | |
|---|---|---|---|
| 5,143,327 A * | 9/1992 | Martin | B64G 1/14 |
| | | | 244/171.3 |
| 5,217,187 A | 6/1993 | Criswell et al. | |
| 5,217,188 A * | 6/1993 | Thole | B64G 1/002 |
| | | | 244/171.6 |
| 5,242,135 A * | 9/1993 | Scott | B64G 1/2427 |
| | | | 244/164 |
| 5,927,653 A * | 7/1999 | Mueller | B64G 1/006 |
| | | | 244/164 |
| 6,921,051 B2 | 7/2005 | Lopata et al. | |
| 7,104,507 B1 * | 9/2006 | Knight | F02K 9/42 |
| | | | 244/171.1 |
| 9,434,485 B1 * | 9/2016 | Lehocki | B64G 1/403 |
| 11,759,837 B1 * | 9/2023 | O'Hanley | B21D 5/008 |
| | | | 29/897 |
| 2006/0169831 A1 * | 8/2006 | Humphrey | F42B 15/12 |
| | | | 244/3.1 |
| 2009/0127398 A1 * | 5/2009 | Johnson | B64G 1/402 |
| | | | 244/158.1 |
| 2009/0206204 A1 | 8/2009 | Rosen et al. | |
| 2013/0043352 A1 * | 2/2013 | Bahn | F02K 9/96 |
| | | | 244/171.1 |
| 2016/0031571 A1 | 2/2016 | Ball et al. | |
| 2018/0354659 A1 * | 12/2018 | Baldwin | B64G 1/402 |

* cited by examiner

COMBINED LAUNCH VEHICLE AND SATELLITE SYSTEM

FIELD OF INVENTION

The present invention relates to the field of launching vehicles into space orbit. More particularly, relates to a satellite combined with the launch vehicle's upper stage utilizing tanks separation technology that allows the satellite system to shed tanks that have used up all the propellants stored in them.

BACKGROUND OF THE INVENTION

Generally, satellites intended for insertion into earth's orbit are adapted for efficient launch by minimizing the amount of launch vehicle cargo capacity.

The traditional design method is primarily based on the given mission requirements and loads, and the subsystems of the satellite, including power supply, attitude control, structure, temperature control, communications, and on-board computer subsystems, are designed separately, and then finally integrated.

Lightweight launches are also designed and configured for efficient launch. Lightweight satellites have the strength or ability for efficient launching, however, cannot survive loads. Practically all satellites intended for quasi-stationary orbit carry along with them at least one major source of thrust for orbital insertions employed to make minor corrections in satellite orbit as well as to control its attitude in orbit. The structural design of the satellite has to take into account the load imposed by its own thrust source or motor and typically the satellite has a thrust axis defined by the orientation of its thrust source along which it is most readily capable of accepting loads.

Other methods for efficient launch are designing the satellite structure which enables a continuous ignition by adding an auxiliary engine to a satellite launch vehicle engine, and more specifically, to a continuous ignition structure.

The conventional design of the launch vehicle consists of lower and upper stages, with a payload placed on top of the upper stage. During deep space missions, the propellant requirement is very high, increasing the structural mass of the upper stage drastically due to tanks alone. In the existing systems usually, there is a separation or deployment of the satellite from the upper stage whereas in our system the satellite itself is an upper stage which will shed the tanks with the plumbing liner after the propellant in it is used up. Also, current existing systems can accomplish the tasks undertaken by satellites with high efficiency, however it takes a long development cycle and high development cost. The main drawback and disadvantages of the existing prior-arts are the mass of the structure, mainly that of the propellant tanks which can be optimized.

The patent application CN108052030A discusses a modular satellite architecture that includes a plurality of functional modules. The size and parameters of each functional module in the multiple functional modules are adjustable, and the plurality of functional modules can be freely combined. The combination can be arbitrarily according to the needs of the task, the debugging time is reduced, the mass production and rapid launch can be fully met, and at the same time the time and cost of the satellite mass production can be greatly reduced; and the main structure of the modular satellite architecture is the various functional modules, each functional module is composed of component modules, and the component modules included in each functional module also have their own modular western standards.

The patent application WO2019098473A1 relates to a partial structure of a rocket, which includes a satellite launcher engine and an auxiliary engine added thereto, to enable continuous ignition by a spark method, and more specifically, proposes a continuous ignition structure for a rocket. In other words, the present invention improves a previous technology for a conventional launcher engine, which fails to satisfy an expected propulsive force due to degradation of an engine performance and thus makes a launch failure.

The U.S. Pat. No. 4,231,537A discusses as satellite intended for insertion into a quasi-synchronous earth orbit is adapted for efficient launch by minimizing the amount of launch vehicle cargo capacity employed. The satellite includes at least one major thrust source, such as an apogee kick motor, defining a major thrust axis for the satellite. A reusable launch vehicle such as the Space Shuttle, includes a cargo bay whose largest dimension is parallel to the launch vehicle thrust axis Minimizing satellite use of cargo bay capacity is obtained by adapting the satellite to lie within the cargo bay of the launch vehicle with its thrust axis perpendicular to the thrust axis of the launch vehicle.

The U.S. Pat. No. 6,921,051B2A discusses low cost, on demand, dedicated launch system is provided for placing micro satellites or space-based instruments at orbital and suborbital altitudes and velocities. The invention describes a space launch vehicle (SLV) that incorporates a single, integrated guidance, navigation, and control unit (GNCU) that performs all guidance and control for the SLV from main stage ignition to orbital insertion. The GNCU can remain with the payload after orbital insertion to provide satellite station keeping and orbital maneuvering capability. The use of a single integrated avionics unit for all guidance, navigation, and control simplifies the SLV, reducing weight and significantly reducing cost. In addition, this architecture allows for a combined launch and satellite bus system as the GNCU can also be used as a satellite bus. This further reduces cost and increases the payload capacity to orbit by optimizing the use of launch vehicle and satellite bus subsystems and reducing non-instrument mass delivered to orbit. All support functions are provided by the IDMV. This approach represents a significant improvement over conventional systems, especially with respect to the orbital launch of payloads less than about 100 kg.

However, none of the prior-arts discuss the structure of the satellite combined with that of the upper stage of the launch vehicle for higher trajectory or increasing the mass of the satellite itself.

The present invention tries to overcome the disadvantages existing in the prior art and provide the structure of the upper stage fused with the satellite that is being carried to the desired orbit.

OBJECTIVE OF THE INVENTION

The primary objective of the present invention is to provide a system, a satellite combined with the launch vehicle's upper stage comprising novel tank separation technology developed to allow the satellite system to shed tanks that have used up all the propellants stored in them for increasing the efficiency.

It is another objective of the present invention to provide a vehicle wherein the structure of the upper stage is fused with the satellite that is being carried to the desired orbit.

Another objective of the present invention is to provide tanks separation technology developed to allow the upper stage to shed tanks that have used up all the propellants stored in them.

Another objective of the present invention is the separation technology that utilizes high accuracy and low shock systems.

Another objective of the present invention is enabling a reduction in mass of the vehicle therein improving the efficiency and in performing deep space missions. This will provide an advantage of going to a higher trajectory or increasing the mass of the satellite itself.

SUMMARY OF THE INVENTION

The present invention relates to the structure of the satellite combined with that of the upper stage of the launch vehicle. As the satellite manoeuvres it slowly sheds off all the used tanks and the structural subsystem attached to it.

In one aspect of the present invention the shedding of tanks helps in achieving high delta V hence helps in reaching higher orbit.

In one aspect of the present invention the structure of the satellite and the design of tanks include plumbing lines with in-built precise separation mechanisms.

The present invention has developed a combined launch vehicle and satellite system wherein the structure of the upper stage is fused with the satellite being carried, and propellant tanks in the upper stage can be separated as and when the propellant in them are depleted. A number of propellant tanks, with in-built separation mechanisms, along with plumbing ducts, electronic components and other accessories are assembled in a way to eject them without causing harmful shocks to the satellite.

The main process here is a step by step separation of components whose function in the flight is completed and remains as a dead load if not removed.

In another aspect of the present invention the reduction in mass of the upper stage during flight results in higher DeltaV and thereby helps in designing an optimized trajectory to either reach higher orbits or increase the mass of the satellite being carried itself. This would help in reducing the overall cost of the launch vehicle manufacturing as well.

In another aspect of the invention, the mass of the upper stage reduces during the flight, enables in designing missions to reach higher orbits for a given satellite mass.

In another aspect of the present invention, the system enables optimized trajectory and reduction of vehicle mass in flight thereby enabling inter-planetary and deep space missions.

BRIEF DESCRIPTION OF THE DRAWINGS

So that the manner in which the above recited features of the present invention are understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

REFERENCE NUMERALS

Figure 1:
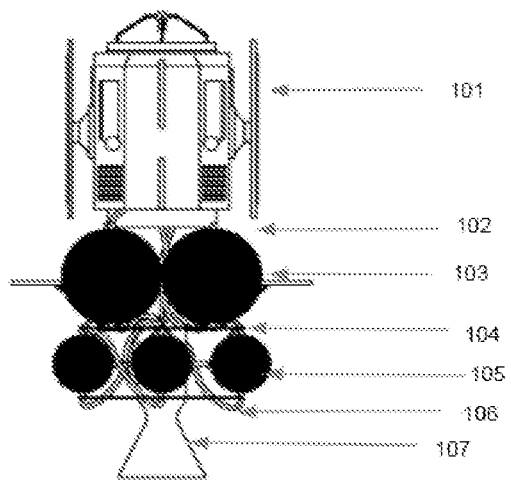
FIG. 1 illustrates the combined launch vehicle satellite system of the present invention.
Figure 2:
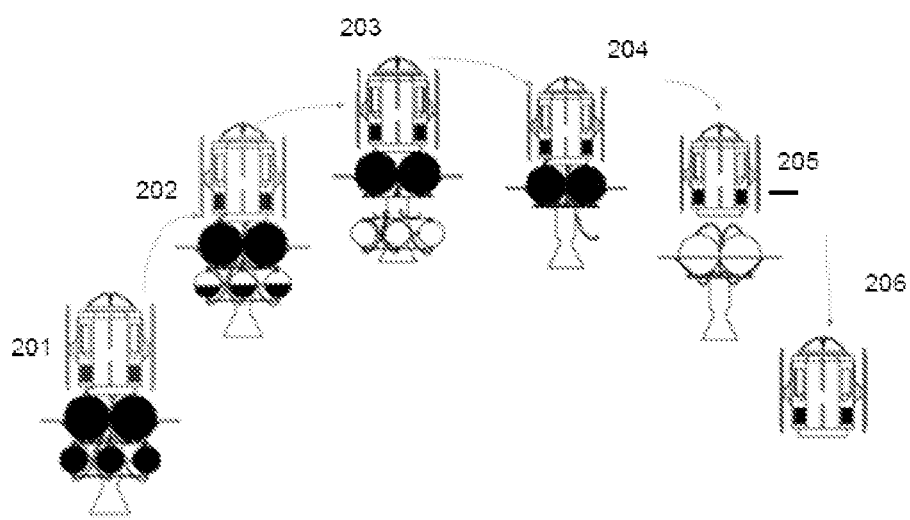
FIG. 2 is a flowchart illustrating the method/process of the tank separation technology of satellite launch of the present invention.

FIG. 1
  Satellite (101)
  Separation plane (102, 104)
  Propellant tanks set 1 and set 2 (103, 105)
  Plumbing lines (106)
  Engine (107)
FIG. 2
  Satellite fused with upper stage (201)
  set 1 tanks getting emptied (202)
  Separation of emptied tanks (203)
  set 2 tanks propellent being used (204)
  Tank Separation (205)
  Satellite orbit insertion (206)

DETAILED DESCRIPTION OF THE INVENTION

The following invention disclosure illustrates various embodiments of a work holding device operably configured to hold a workpiece that is to be processed and the method for determining change in clamping force thereof.

The principles of the present invention and their advantages are best understood by referring to FIG. 1 and FIG. 2. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

FIG. 1 is the illustration of the combined launch vehicle and satellite system of the present invention. In accordance to the present invention, the system includes and is characterized of satellite (101); a separation plane (102); first set of propellant tanks (103), another separation plane below (104); a another set of propellant tanks (105); plumbing lines (106) and an engine (107).

FIG. 2 is a flowchart illustrating a process of the entire launch system wherein the process involves stage wise separation of the tanks after usage and is explained in each of the embodiment below:

In one embodiment of the present invention the propellant tank is divided into a number of tanks (103, 105) and the plumbing line (106) is implemented in such a way that it does not affect the separation process.

In another embodiment of the present invention wherein once the set of tanks is emptied it is separated from the main structure which includes the complete combined satellite with upper stage (201). The separation of the tank set is enabled by using a merman band or pneumatic type of separation system and FIG. 2 shows the bottom set of tanks (105) in getting emptied condition (202) during the process, followed by the separation of these emptied tanks (203) wherein the fuel is completely utilized and the tanks that are empty are of no use at present. The first set of tanks (103) are then separated after the fuel is emptied (204). Similarly, the plumbing lines (106) are also separated along-with when the tank is separated. The emptied set of tanks (103) and separation of the used components is achieved herein (205) and the satellite is ready for orbit insertion (206). Here, reduction in mass of the upper stage during flight results in higher DeltaV and thereby helps an optimised trajectory to reach higher orbits and increase the mass of the satellite being carried itself, also reducing the overall cost of the launch vehicle manufacturing as well.

In another embodiment of the present invention the connections between plumbing lines (106) and tanks are designed with mechanisms to close the plumbing line once the connection is removed.

In accordance with the present invention the non-pyro separation mechanism is used to separate the plumbing line from the propellant tanks (103, 105). The plane of separation in the plumbing line is placed at the end of the line away from the propellant tank in order to reduce the mass of plumbing lines being carried during the flight.

In another embodiment of the present invention, the trajectory is developed to provide a short coasting period during the switching from used propellant tanks to the fresh ones. After the first separation of tanks the propellant supply to the engine is switched to the existing tanks during the coasting time In accordance to the present invention, once the payload has reached a certain altitude, all used propellant tanks are separated from the primary payload, and the payload is further injected into desired orbit. Electrical components including batteries utilized for the separation mechanism are also separated after the separation is achieved.

In accordance to the present invention it was found that by separating the spent propellant tank from the ongoing stage we can achieve a significant payload gain. This is achieved by splitting the propellant tank to multiple tanks and arrange them in such a way that it could be separated out once spent.

Figure 3:
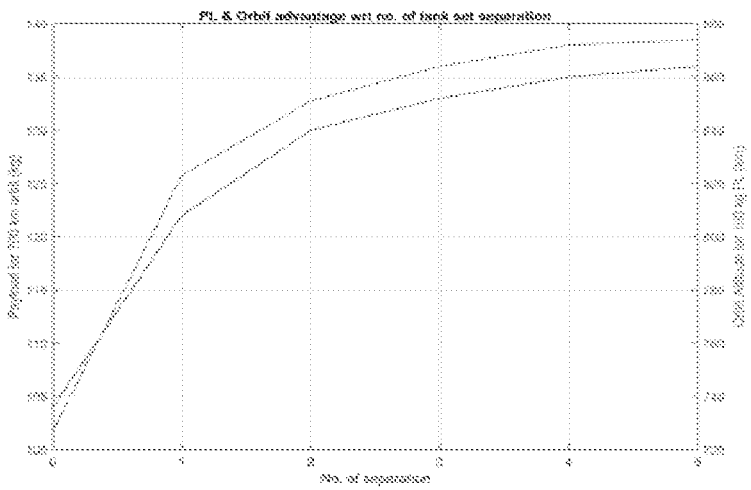
FIG. 3 Payload mass achieved for 700 km altitude and orbital altitude achieved for 100 kg payload for different numbers of tank separations in accordance to the present invention.
Figure 4:
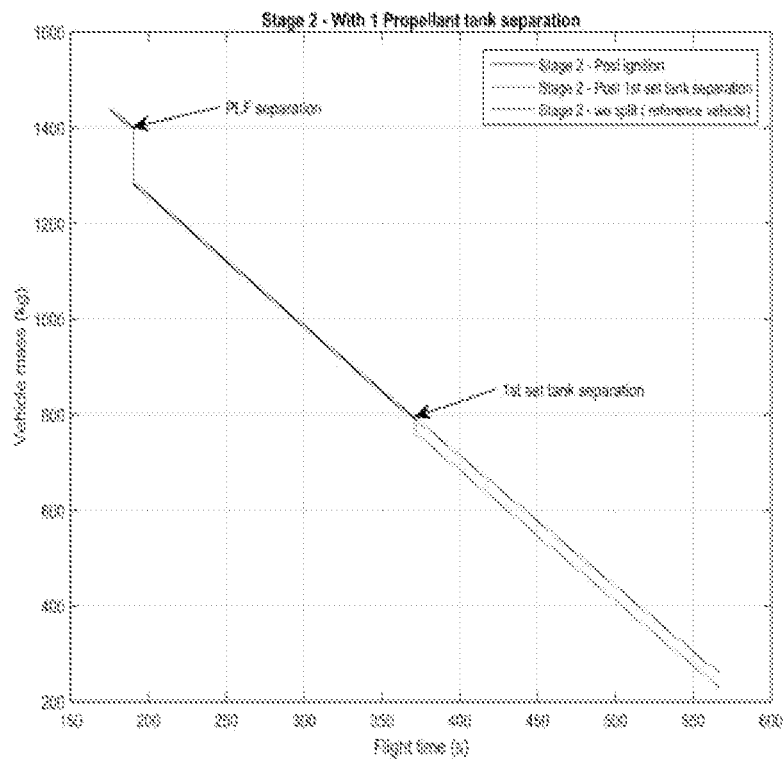
FIG. 4 upper stage (stage 2) mass depletion for 1 tank separation (1st set of propellant tank separation) with respect to flight time in accordance to the present invention.
Figure 5:
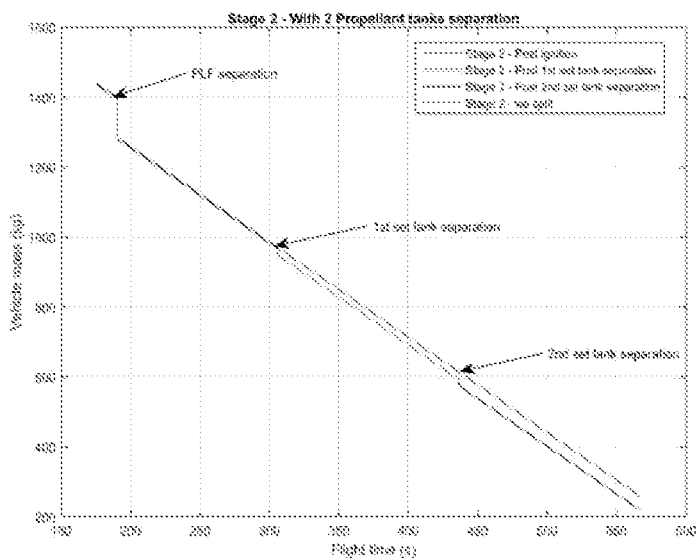
FIG. 5 upper stage (stage 2) mass depletion for 2 tank separation (2 sets of propellant tanks separated one after the other) with respect to flight time in accordance to the present invention.
Figure 6:
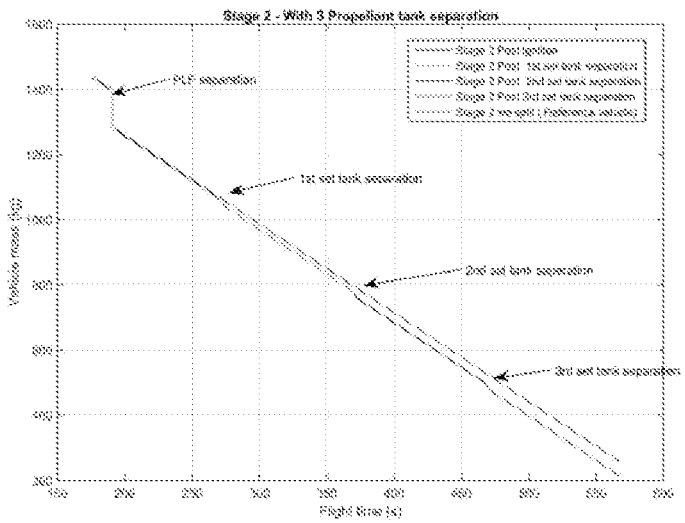
FIG. 6: upper stage (stage 2) mass depletion for 3 tank separation (3 sets of propellant tanks separated one after the other) with respect to flight time in accordance to the present invention.
Figure 7:
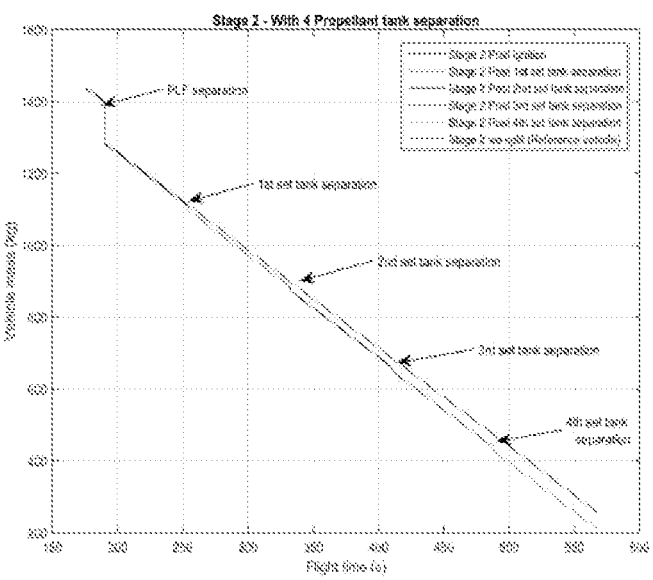
FIG. 7: upper stage (stage 2) mass depletion for 4 tank separation (4 sets of propellant tanks separated one after the other) with respect to flight time in accordance to the present invention.
Figure 8:
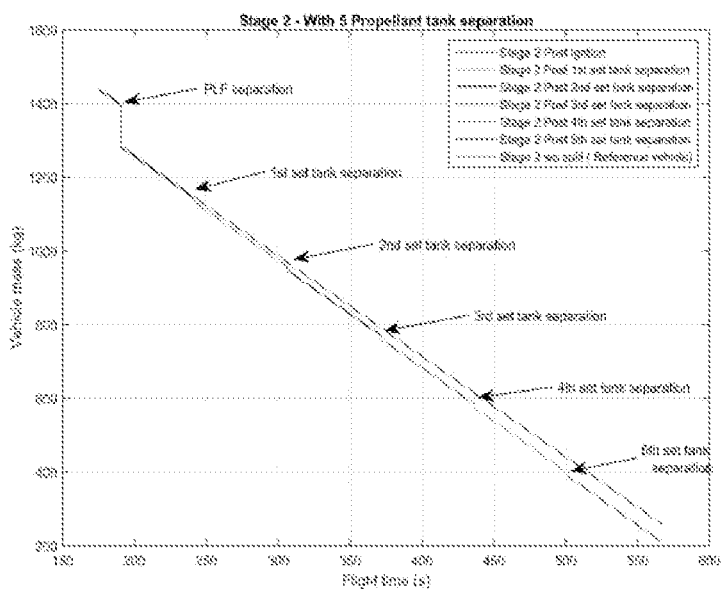
FIG. 8: upper stage (stage 2) mass depletion for 5 tank separation (5 sets of propellant tanks separated one after the other) with respect to flight time in accordance to the present invention.

FIG. 3 illustrates the payload mass that can be taken to 700 km altitude and the orbital altitude that can be achieved for 100 kg payload for different numbers of tank separations.

From the FIG. 3 we can observe that till separating the two sets of tanks the payload capacity that may be taken is high.

FIGS. 4,5,6,7, and 8 shows the stage mass depletion with the flight time for the different tank separation case.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention as claimed.

We claim:

1. A combined launch vehicle and satellite system comprising:
    satellite (101);
    a first separation plane (102);
    a first set of propellant tanks (103),
    a second separation plane (104) positioned below the first set of propellant tanks;
    a second set of propellant tanks (105); and
    plumbing lines (106); and
    an engine (107), wherein the plumbing lines are configured to connect the first set of propellant tanks and the second set of propellant tanks to the engine for supplying propellants from the second set of propellant tanks and then from the first set of propellant tanks,
   wherein, when in operation, the combined launch vehicle and satellite system is configured to:
    enable in-built separation mechanisms of the plumbing lines to separate the second set of propellant tanks from a primary load of the combined launch vehicle and satellite system, when the second set of propellant tanks are emptied by disconnecting and closing respective connections of the plumbing lines of the second set of propellant tanks; and
    enable in-built separation mechanisms of the plumbing lines to separate the first set of propellant tanks from the primary load of the combined launch vehicle and satellite system, when the first set of propellant tanks are emptied by disconnecting and closing respective connections of the plumbing lines of the first set of propellant tanks,
   wherein a separation for the first set of propellant tanks and the second set of propellant tanks is enabled by a merman band or a pneumatic separation system, wherein the plumbing lines are placed at the end of the line away from the respective propellant tank that is emptied, to reduce mass of the plumbing lines being carried during a flight after separation.

2. The combined launch vehicle and satellite system as claimed in claim 1, wherein the first set of propellant tanks and the second set of propellant tanks include at least one propellant tank implemented with the plumbing line (106) in such a way that it does not affect the separation process.

3. The combined launch vehicle and satellite system as claimed in claim 1, wherein the first set of propellant tanks or the second set of propellant tanks is separated from a main structure which includes the complete combined satellite with an upper stage (201) upon being emptied.

4. The combined launch vehicle and satellite system as claimed in claim 1, wherein the second set of propellant tanks (105) are utilized first (202).

5. A method of tank separation technology for a combined launch vehicle and satellite comprising the steps of:
    performing a stage wise separation of a first set of propellant tanks and a second set of propellant tanks after usage, including emptying the second set of propellant tanks initially of fuel, enabling in-built separation mechanism of plumbing lines to separate the second set of propellant tanks from a primary load of the combined launch vehicle and satellite system by disconnecting and closing respective connections of the plumbing lines of the second set of propellant, emptying the first set of propellant tanks, enabling in-built separation mechanisms of the plumbing lines to separate the first set of propellant tanks from the primary load of the combined launch vehicle and satellite system by disconnecting and closing respective connections of the plumbing lines of the first set of propellant tanks, and enabling a satellite to ready for orbit insertion (206), wherein the separation of the tanks (103, 105) is enabled by a merman band or a pneumatic separation system, wherein the plumbing lines are placed at the end of the line away from the respective propellant tank that is emptied, to reduce mass of the plumbing lines being carried during a flight after separation.

6. The method of tank separation technology for combined launch vehicle and satellite as claimed in claim 5, wherein trajectory is developed to provide a short coasting period during the switching from used propellant tanks to the fresh ones.

7. The method of tank separation technology for combined launch vehicle and satellite as claimed in claim 5, wherein after the first separation of tanks the propellant supply to the engine is switched to the existing tanks during the coasting time.

8. The method of tank separation technology for combined launch vehicle and satellite as claimed in claim 5, wherein the said payload has reached a certain altitude, all used propellant tanks are separated from the primary payload, and the payload is further injected into desired orbit.

9. The method of tank separation technology for combined launch vehicle and satellite as claimed in claim 5, wherein the said separating of the spent propellant tank from the ongoing stage achieves a significant payload carrying capacity gain which is achieved by splitting the propellant tank to multiple tanks and arranging them in such a way that it could be separated out once spent.

10. The method of tank separation technology for combined launch vehicle and satellite as claimed in claim 5, where non-pyro separation mechanism is used to separate the plumbing line from the propellant tanks (103, 105).

* * * * *